United States Patent [19]

Picandet

[11] 3,930,125

[45] Dec. 30, 1975

[54] CONNECTION NETWORK FOR A TIME SWITCHING AUTOMATIC ELECTRONIC EXCHANGE

[75] Inventor: Jean A. Picandet, Paris, France

[73] Assignee: Jeumont-Schneider, Puteaux, France

[22] Filed: July 5, 1974

[21] Appl. No.: 486,080

[30] Foreign Application Priority Data

July 6, 1973 France .............................. 73.24841

[52] U.S. Cl. .............................................. 179/15 AQ

[51] Int. Cl.² ........................................ H04Q 11/04

[58] Field of Search ...... 179/15 AQ, 15 AT, 15 AL, 179/15 A

[56] References Cited

UNITED STATES PATENTS

| | | | |
|---|---|---|---|
| 3,458,659 | 7/1969 | Sternling | 179/15 AQ |
| 3,715,505 | 2/1973 | Gordon | 179/15 AQ |

*Primary Examiner*—Kathleen H. Claffy
*Assistant Examiner*—Joseph Popek
*Attorney, Agent, or Firm*—David A. Blumenthal

[57] ABSTRACT

A connection network for an electronic time switching PCM automatic exchange, wherein a given PCM code in an incoming time slot of a line may be routed to any desired time slot in any one of a group of output PCM channels.

9 Claims, 2 Drawing Figures

CONNECTION NETWORK FOR A TIME SWITCHING AUTOMATIC ELECTRONIC EXCHANGE

BACKGROUND OF THE INVENTION

1. Field of the Invention

This invention relates to a connection network for an automatic electronic time switching PCM exchange.

2. Description of the Prior Art

In a PCM telephone exchange, telephone calls are routed in the form of digitally encoded signals arising from the analog-to-digital conversion of telephone signal samplings taken at consecutive regular instants of time.

The standards of the European Postal and Telecommunications conference call for a sampling period of 125 microseconds divided into 32 consecutive 3.9 microsecond intervals called time slots, each interval corresponding to the transmission of a telephone signal in an 8 bit code. Consequently, up to 32 different calls can go by way of a single transmission channel; further channels must be provided if more than 32 calls have to be transmitted.

There are separate speech directions; for each direction of communication there is a time slot allotted to the incoming telephone signal and a time slot allotted to the outgoing telephone signal.

The purpose of the connection network according to this invention is to be able to connect any time slot of any incoming PCM multiplex line to any time slot of any outgoing PCM multiplex line.

The connection network according to this invention has the advantage over the prior art connection networks of using fewer components and therefore taking up less space.

SUMMARY OF THE INVENTION

The connection network according to this invention is characterized in that it comprises for each incoming multiplex PCM line, a first set of series shift registers equal in number to the number of time slots in the channel or line. Each digital code of one such time slot is stored in series in one of the register and is circulated therein by means of shift pulses supplied by a clock or time base. The register output occurs periodically with a period equal in length to the time slot length. For each multiplex PCM outgoing line, a set of multiplexing circuits is provided for routing the output of any of the registers to the outgoing line; the number of multiplexing circuits for each outgoing line is equal to the number of incoming lines.

The invention further comprises a second set of series shift registers connected to the multiplexing circuits. Each of the second set of registers has as many positions as there are time slots in the PCM multiplex. Pulses are shifted through the second set of shift registers in a time equal to the length of the sampling period of the PCM multiplex, and in each time interval corresponding to the time interval of a time slot, an address code is sent from the second set of shift registers to the multiplexing circuits to indicate which of the first set of shift register is to be connected to the outgoing multiplex PCM line. Thus, the bits of the address code define the destination time slot on the outgoing line.

BRIEF DESCRIPTION OF THE DRAWINGS

The invention will be more clearly understood in reference to the preferred embodiment and to the accompanying drawings wherein.

DETAILED DESCRIPTION OF THE PREFERRED EMBODIMENT

Figure 1:
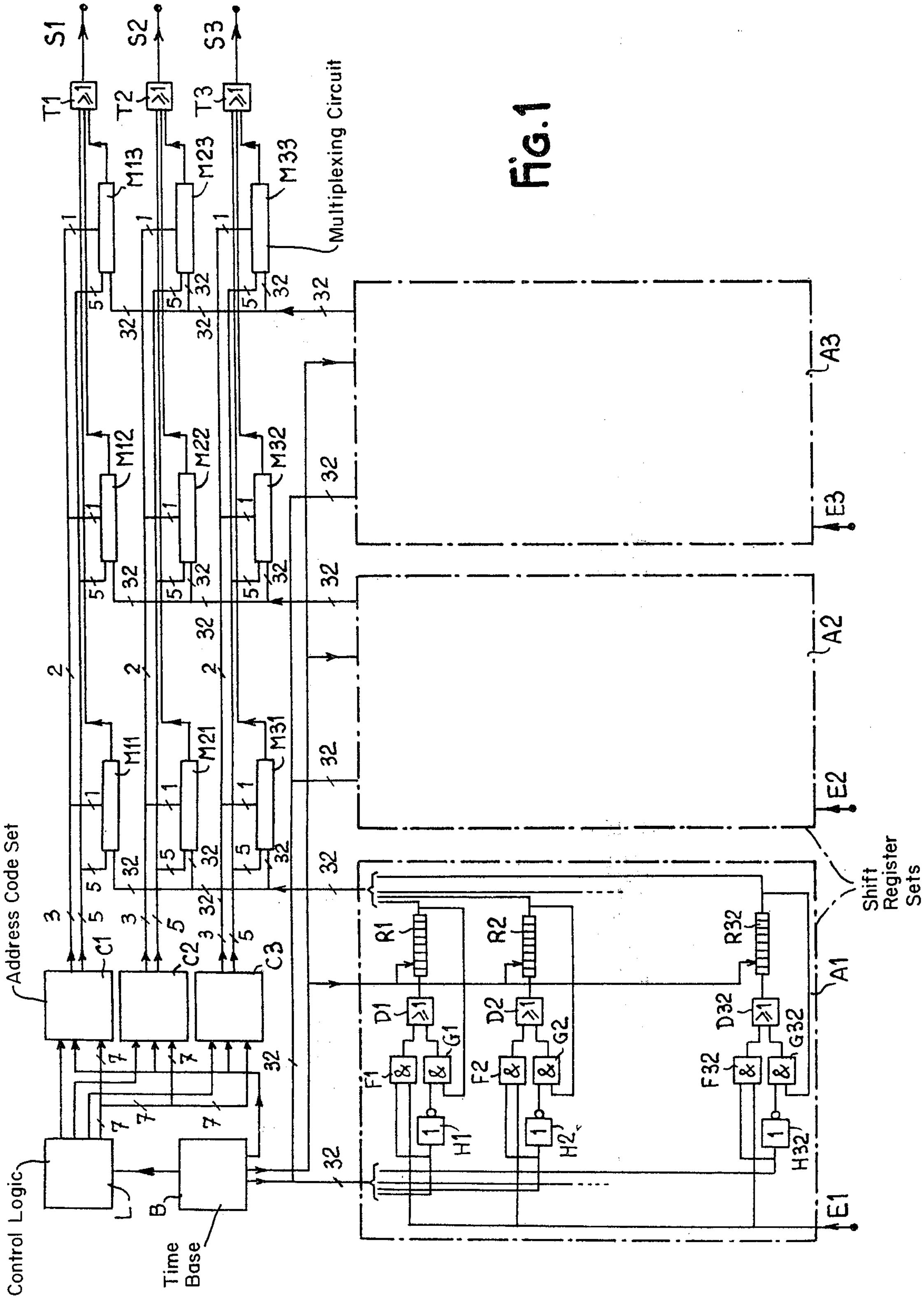
FIG. 1 shows the complete diagram of the connection network which, so as to simplify the drawing, is for three incoming lines and three outgoing lines.

Referring to FIG. 1, each of three incoming PCM multiplex lines E1, E2, E3 comes from an analog-to-digital converter (not shown) outputting sequentially 32 different calls in an 8 bit code, corresponding to a 125 microsecond telephone signal sampling frequency. The lines E1, E2 and E3 are connected to sets of identical shift registers A1, A2, A3 respectively. A detailed diagram has been given only of the set A1 so as to simplify the drawing.

The set A1 comprises 32 identical circuits which are distinguished from one another by letters followed by numbers from 1 to 32 respectively; however, so as to keep the drawings simple only three of such circuits are shown. Each such circuit, for instance, the second circuit, takes the form of an 8-position series shift register R2 - i.e., the register has as many positions as there are bits in the code. The input of register R2 is connected to the output of an OR-gate D2 whose two inputs are connected to the outputs of two AND-gates F2, G2 respectively. One of the two inputs of gate G2 is connected to the output of register R2 and the other input is connected to the output of a NOT-gate H2 whose input is connected to a clock or time base B. One of the two inputs of gate F2 is connected to the input of gate H2 and the other input is directly connected to line E1.

The time base B controls the routing of each 8 bit code to one of the 32 shift registers R1 to R32, where the incoming code is stored for 125 microseconds. For each incoming code, the eight bits are circulated by means of shift signals supplied by the time base B. The register outputs occur periodically, one code appearing every 3.9 microseconds. The register contents are renewed periodically every 125 microseconds. Consequently, in each sampling period the code of any time slot is available in series at the output of its particular register at each beginning of a 3.9 microsecond time slot.

To route the content of any register to any of the outgoing PCM multiplex lines S1 or S2 or S3, a conventional multiplexer circuit of known characteristics is provided. Each outgoing line requires as many multiplexers as there are incoming lines. Consequently, in the particular example selected, three sets each consisting of three multiplexers, namely M11, M12, M13; M21, M22, M23; and M31, M32, M33 are needed.

The choice of an input channel of a multiplexer from amongst the thirty-two possible channels is determined by means of a 5 bit address code which is fed to the multiplexer at the required time to route the contents of the corresponding 8 bit register to one of the outgoing lines S1 or S2 or S3.

When a connection is made, the address code presented to the multiplexer must be present for not more than 3.9 microseconds for each sampling period, so that the consecutive codes are routed from the incoming line to the outgoing line. Since 32 calls can be routed to a single outgoing line, there may be up to 32 address codes to be presented consecutively to the input of any single multiplexer. Such a code is therefore embodied by means of 5 bits.

Figure 2:
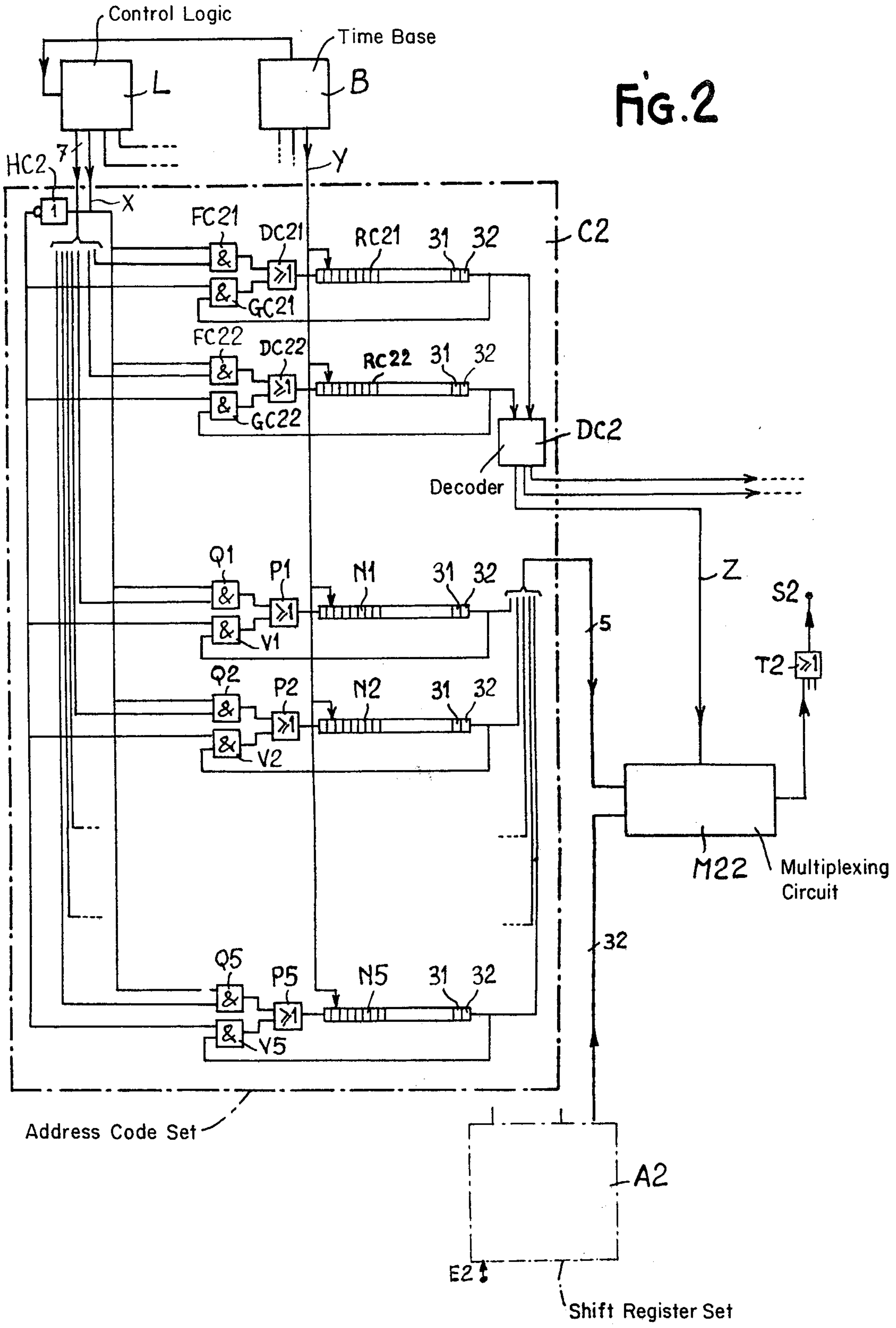
FIG. 2 shows the control circuit for one of the multiplexers of FIG. 1.

FIG. 2 shows details of one of the three sets C1, C2, C3 needed to store address codes for multiplexer control. To simplify the drawing, only the set C2 is shown, it being identical to the other sets C1 and C3; similarly, only one of the multiplexers M22 of the set of identical multiplexers M21, M22, M23 associated with the outgoing line S2 for the set C2 is shown.

Extending to multiplexer M22 are the 32 wires corresponding to the outputs of the shift registers R1 to R32 respectively of the set A2 for the incoming line E2, and the output wires of five identical 32 position series type shift registers N1 to N5 - i.e., as many positions as there are time slots in the PCM multiplex. The registers N1 to N5 serve to store the consecutive address codes on a circulating basis.

OR gates P1 to P5 and AND gates Q1 to Q5, V1 to V5 are connected to the registers N1 to N5 in the same way as the gates D, F and G are connected to the registers R of the sets A of FIG. 1. However, whereas NOT gates H1 to H32 are necessary for each circuit of a set A, a single NOT gate HC2 is sufficient for the set of registers N1 to N5, gate HC2 providing parallel actuation of all the circuits of the registers N1 to N5, the input line X of gate HC2 coming from a control logic L controlled by the time base B. Every second input of the AND gates Q1 to Q5 which is not connected to the line X is connected to the control logic L. The registers N1 to N5 shift at the beginning of every 3.9 microsecond period to obtain a new address code.

The multiplexer is selected from the set of multiplexers M21, M22, M23 controlled by the set C2 by means of a complementary address code and of a decoder DC2. Since there are only three multiplexers in the example chosen, the complementary code needs to have only two bits; such code is produced by means of two circuits identical to the circuits of the registers N1 to N5 — i.e., circuits comprising thirty-two position shift registers RC21 and RC22 respectively, OR gates DC21 and DC22 respectively, and AND gates FC21, GC21 and FC22, GC22 respectively. Decoder DC2 has three outputs, one, Z, of which goes to M21 and the others to M22 and M23 respectively. Such outputs serve as an opening input for the multiplexers. The outputs of the three latter multiplexers serve as the input for an OR gate T2 whose output is connected to the outgoing line S2.

Similar considerations apply to all the other multiplexer sets with the gates T1 and T3.

Time base B controls the shifting of all the registers RC and N via the common line Y and is responsible for synchronized operation of all the elements of the sets C1, C2, C3 of the control logic L.

The number of incoming and outgoing lines has been restricted in the example chosen so as to keep the drawings and description of operations simple; in fact, however, there can be any number of incoming and outgoing lines.

The invention is of use not only for telephony but also for data transmission systems, multiplex PCM encoded data being routed directly to the incoming lines.

I claim:

1. A connection network for connecting incoming channels to outgoing channels in an automatic electronic time switching PCM exchange comprising:

a first set of circulating shift registers for each incoming PCM channel, the number of circulating shift registers in each set equal to the number of time slots in an incoming channel, said first set of circulating shift registers providing a serial bit output, a set of multiplexing circuits for each outgoing channel the number of circuits in each set equal in number to the number of incoming channels, means for directly connecting the serial bit output from said first set of circulating shift registers to said multiplexing circuits, means for connecting said multiplexing circuits to said outgoing channels, means for providing address codes to said multiplexing circuits for identifying a circulating shift register within said first set of circulating shift registers for each incoming PCM channel, and clock means for shifting said circulating shift registers and for actuating said address code providing means.

2. A connection network as recited in claim 1 wherein the number of address code providing means is equal to the number of incoming channels.

3. A connection network as recited in claim 1 wherein said address code providing means comprises:

a second set of shift registers for each first set of shift registers, said second set of shift registers connected to respective sets of multiplexing circuits for providing address codes thereto.

4. A connection network as recited in claim 3 wherein the number of stages in each shift register in said second set is equal to the number of time slots in said PCM incoming channel.

5. A connection network as recited in claim 4 wherein the number of shift registers in said second set of shift registers is equal to or greater than n, where $2^n$ is equal to the number of stages in each of said first set of shift registers, said second set of shift registers being circulating shift registers.

6. A connection network as recited in claim 1 further comprising a plurality of multiplexing circuit identifying means for providing codes for identifying each multiplexing circuit within a given set.

7. A connection network as recited in claim 6 wherein each identifying means comprises a plurality of shift registers having a number of stages equal to the number of time slots in the PCM incoming channel.

8. A connection network as recited in claim 7 wherein said shift registers of said identifying means are circulating shift registers.

9. A connection network as recited in claim 1 wherein said means for connecting said multiplexing circuit to said outgoing channels comprises gate means for directly connecting said multiplexing circuit to said outgoing channels whereby said serial bit output from each of said first set of circulating shift registers is fed to said outgoing channels.

* * * * *

UNITED STATES PATENT OFFICE

CERTIFICATE OF CORRECTION

Patent No. 3,930,125 Dated December 30, 1975

Inventor(s) JEAN PICANDET

It is certified that error appears in the above-identified patent and that said Letters Patent are hereby corrected as shown below:

In column 3, line 46, delete "M21" and insert therefor --M22--;

line 47, delete "M22" and insert therefor --M21--.

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*